(12) United States Patent
Millen et al.

(10) Patent No.: US 7,953,388 B2
(45) Date of Patent: May 31, 2011

(54) RETRIEVING JURISDICTION INFORMATION FROM HOME LOCATION REGISTER

(75) Inventors: Stephanie L. Millen, Batavia, IL (US); Martin H. Van Leeuwen, Oswego, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 12/655,884

(22) Filed: Jan. 7, 2010

(65) Prior Publication Data
US 2010/0112977 A1    May 6, 2010

(51) Int. Cl.
*H04M 11/00* (2006.01)

(52) U.S. Cl. ............. 455/406; 455/445; 455/435.1; 455/433; 455/414.1; 455/432.1; 455/426.1; 455/405; 455/407; 455/408; 455/566; 455/412; 455/414.3; 379/211.01; 379/211.02; 379/212.01; 379/114.21; 379/114.27; 379/114.28; 379/114.29; 379/115.01; 379/115.02

(58) Field of Classification Search .......... 455/406, 455/445, 435.1, 433, 414.1, 432.1, 426.1, 455/405, 407, 408, 566, 412, 414.3; 379/211.01, 379/211.02, 212.01, 114.21, 114.27, 114.28, 379/114.29, 115.01, 115.02
See application file for complete search history.

(56) References Cited

U.S. PATENT DOCUMENTS

| | | | |
|---|---|---|---|
| 5,771,275 A * | 6/1998 | Brunner et al. | 370/385 |
| 5,854,982 A * | 12/1998 | Chambers et al. | 455/445 |
| 6,978,134 B1 * | 12/2005 | Palviainen | 455/433 |
| 2002/0167906 A1 * | 11/2002 | La Porta et al. | 370/252 |
| 2004/0132449 A1 * | 7/2004 | Kowarsch | 455/432.1 |

* cited by examiner

*Primary Examiner* — Patrick N Edouard
*Assistant Examiner* — Justin Y Lee
(74) *Attorney, Agent, or Firm* — Carmen Patti Law Group, LLC

(57) ABSTRACT

Calls to a wireless telephone number that are to be redirected by a gateway switch to another number can be properly billed, even if the wireless telephone number is ported to another service provider by billing the wireless telephone number subscriber for the charge that would have been incurred by placing a call to the forwarded number from the mobile telephone located in its home service area.

14 Claims, 4 Drawing Sheets

RETRIEVING JURISDICTION INFORMATION FROM HOME LOCATION REGISTER

TECHNICAL FIELD

The invention relates generally to wireless communications system and more particularly to a method and apparatus by which calls redirected from a mobile phone number to another number can be billed based on the service provider and the distance over which the forwarded call portion would have traveled if it had been placed by the non-roaming mobile telephone.

BACKGROUND

Wireless communication has become nearly ubiquitous and competition between service providers often induces subscribers to switch to carriers that a subscriber believes or perceives to be providing a better "deal." Until recently, an adverse consequence of changing carriers has been the forfeiture of a wireless phone number. Recently, service providers have been compelled to offer number portability by which a subscriber of one service provider can terminate his service and carry or "port" the number given to him by one service provider to another service provider. This is possible as long as the number remains in the same relative geographic location (i.e., the number remains within the original rate center.) It is even possible to port a wireline number to a wireless service provider. In the future, number portability will provide the ability to port a phone number from one disparate geographic location to another.

Such number portability has led to at least one problem for carriers.

Heretofore, it was possible to identify a switch from which a call originated and hence the service provider of the switch from whence a call originated, simply by the first few digits of a phone number. The identity of a service provider responsible for collecting revenue from a customer for a call could be determined by the number from which the call originated.

With the advent of service provider number portability, a wireless subscriber who obtains a wireless phone number from a service provider could have his mobile phone number "ported" to a new wireless service provider. If the subscriber uses his wireless phone to forward calls to another location, the calls that were made to the subscriber's phone, would need to be routed by the subscriber's new service provider to the forwarded destination number. If the forwarding phone's number were used to determine the service provider from which to exact payment for the call forwarding, using just the phone numbers it would appear that a call originated from the mobile customer's old service provider's network.

As is well-known, charges for so-called long-distance calls and charges for so-called "toll" calls are enhanced over the charges imposed by carriers for "local" calls. As is also known, the determination and hence the charge for a call is primarily determined by the geographic distance between the location of the calling phone and the phone being called.

Heretofore, it was possible to identify a switch that a call originated from and hence the geographic location of where a call originated from, simply by the first few digits of a phone number. The charge to exact from a customer for a call could be determined by comparing the number being called to the number from which the call originated and calculating or deriving the distance and systems through which the call would have been carried.

With the advent of number portability, in prior art, carriers have begun to identify the originating location of a call by means of a the 6 digit area code and office code of a location routing number assigned to the originating switch since the mobile number no longer identifies the originating switch or service provider. In the case of redirecting a call from a gateway switch, the gateway doesn't have the 6 digit code to identify the location of the switch from which the call would have originated if the forwarding phone had placed the call itself from its home service area. The intent of this invention is to provide a method by which a gateway switch can obtain data sufficient to identify the service provider and location of the switch, or geographic division thereof, from which a redirected call would have originated had the call originated from the mobile subscriber's home service area.

In order to more properly bill for call forwarding services provided to mobile phone subscribers who have ported their phone numbers from one service provider to another, there exists a need for tracking the service provider and the location of the mobile phone switching system, or a geographic division thereof, from which a mobile phone number that forwarded a call, would have originated the call if the forwarding phone had placed the forwarded call itself from its home service area.

SUMMARY

The invention in one implementation encompasses a home location register data base, embodied as a processor coupled to a wireless communications network through any appropriate prior art network interface. A data storage device, such as one or more hard disk drives that is operatively coupled to the processor stores wireless subscriber information. Computer-readable signal-bearing media coupled to the processor enable the processor to receive inquiries from communications network switches that are also coupled to the home location register data base.

The processor executes a method, which includes sending subscriber information to network switches. When a network switch receives a call that is to be routed to a wireless telephone, the network switch first queries the home location register data base about the wireless telephone. If the wireless telephone has been set up to forward its calls to another number, the home location register data base sends a response to the inquiring network switch, informing it of the number to which the call should be forwarded, and, the identity of a switch in the wireless network from which the wireless telephone should be charged for placing a call to the number to which its calls are to be forwarded.

DESCRIPTION OF THE DRAWINGS

Features of exemplary implementations of the invention will become apparent from the description, the claims, and the accompanying drawings in which:

DETAILED DESCRIPTION

Figure 1:
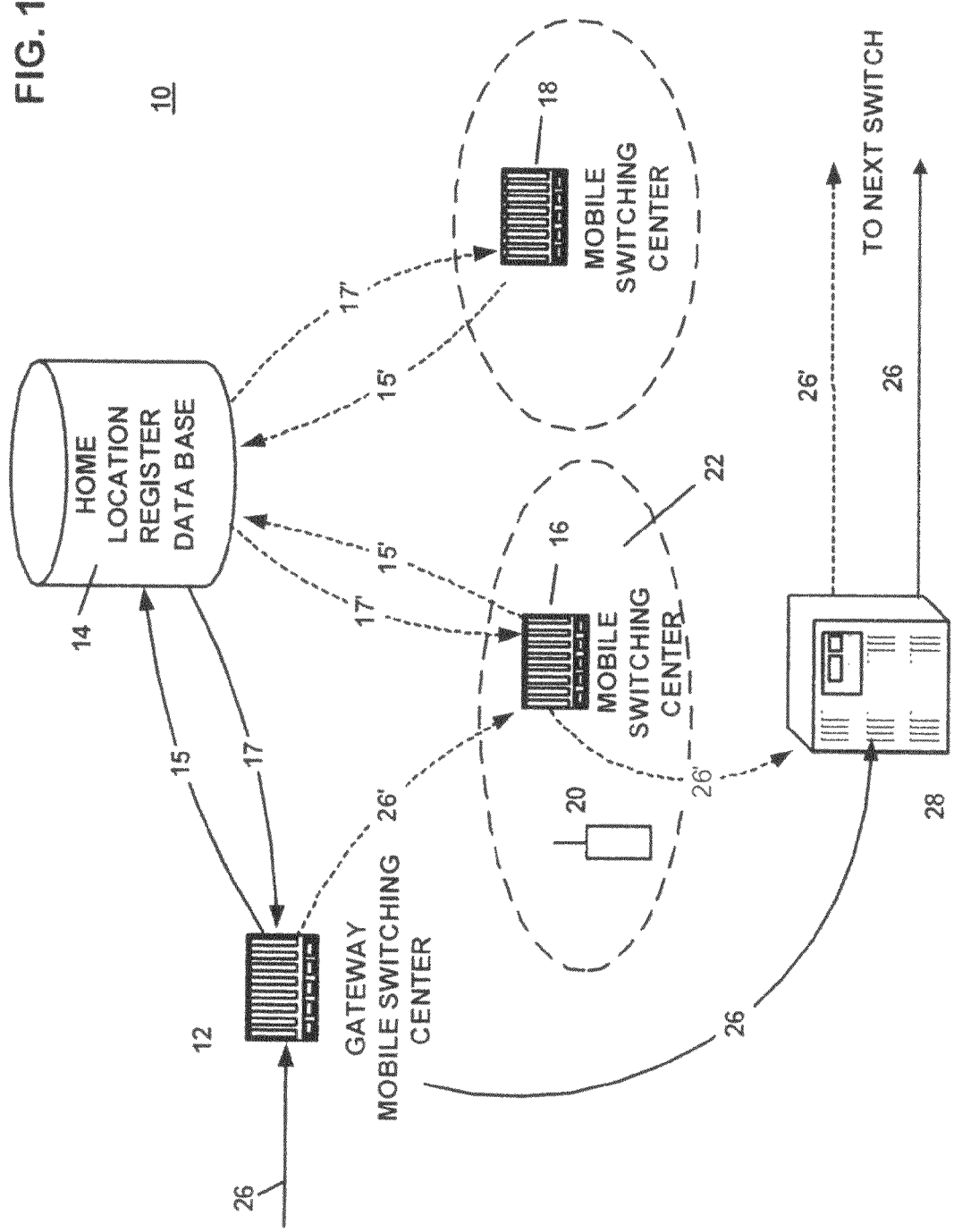
FIG. 1 is a representation of one implementation of a wireless network that comprises a home location register data base that communicates with mobile switching centers in a wireless network and a gateway mobile switching center.

Turning to FIG. 1, a wireless communication network 10 comprises a central gateway mobile switching center 12, a home location register data base 14 and at least two mobile switching centers 16 and 18, each of which is a mobile switching center for a wireless service provider (not shown) that provide wireless communications services to the wireless telephones 20 of service subscribers throughout a geographic area 22. As shown in FIG. 1, the gateway mobile switching center 12 and both of the mobile switching centers 16 and 18 are linked to the home location register data base 14 via appropriately-capable data links 15' and 17' over which call routing and other information pertinent to the network 10 can be carried.

When a call 26 is placed to a wireless subscriber's telephone 20 from outside the network 10, the call 26 is eventually routed to the central gateway mobile switching center 12 (e.g., through the public switched telephone network or PSTN). At least one function of the gateway mobile switching center 12 is to route the call 26 to a mobile switching center 16 or 18 from which a wireless communications link can be established with the wireless subscriber's telephone 20.

In the preferred embodiment, when a call 26 to be routed to a wireless subscriber's telephone 20 is received by the central gateway mobile switching center 12, the central gateway mobile switching center 12 sends a data message 15 that is a query to the home location register data base 14 for information about the telephone 20 and the service provided to the subscriber's telephone 20 by the wireless service provider. The form of the query message 15 sent to the home location register data base 14 is not critical. Existing protocols, such as those compliant with ANSI-41 standard as well as others that are known to those of skill in the art, can be used. The home location register data base 14 functions as data storage device that preferably stores several pieces of information about each wireless subscriber of a wireless service provider. Among other things, the home location register data base 14 stores the electronic serial number or ESN and the mobile identification number or MIN of each subscriber's phone 20, including the digits of the wireless telephone's number. The home location register data base 14 also stores information that identifies the communication services provided to a subscriber's phone by the service provider, such as whether a phone is entitled to services such as call forwarding and if so, a number or numbers to which a call 26 to a phone 20 is to be routed if the subscriber has activated call forwarding.

The home location register data base 14 can also store the identity a mobile switching center or geographic coverage area thereof, into which the mobile telephone's number was ported into, by the service provider at the subscriber's request. The "identity" of a mobile switching center into which a number is ported can be in the form of a six digit area code and office code (commonly known to those of ordinary skill as the jurisdiction information parameter or "JIP") that is unique to the geographic location assigned to the mobile subscriber's home service area. That mobile switching center is herein considered to be the "home" mobile switching center for that subscriber.

In the prior art, when a mobile telephone subscriber activated call forwarding, calls to the mobile telephone 20 from outside the service provider's network needed to be routed to a particular mobile switching center, (16 or 18 for example) having jurisdiction for the particular mobile telephone number. (The prior art method of routing the call to a mobile switching center is shown in FIG. 1 as the broken line between the gateway mobile switching center 16 that is identified by reference numeral 26') Thereafter, the mobile switching center for the mobile phone 20 being called, would have forwarded the call on to another switching system 28 in the PSTN, that would have routed the call 26' to the number to which the subscriber forwarded his calls. Routing a call to a mobile switching center having jurisdiction for a particular mobile phone number is not economically advantageous.

In the preferred embodiment, information stored in the home location register data base 14 includes at least one number to which a call 26 to a wireless subscriber's telephone 20 number is to be forwarded but also includes the identity of the mobile switching center, or a geographic division thereof, having "jurisdiction" for the wireless subscriber number to which a call 26 was placed. In other words, the home location register data base 14 stores the identity of a mobile switching center 16 of a wireless communications service provider, to which a call 26 to the wireless subscriber number is to be routed, when a call to the non-roaming wireless subscriber is not to be forwarded to a second number.

Still referring to FIG. 1, when the home location register data base 14 receives the query message 15 that requests information from the gateway mobile switching center 12, the home location register data base 14 returns a responsive message 17 to the gateway mobile switching center 12 that includes, among other things, information as to how and where to route the call 26 so that it will be forwarded as specified by the subscriber. If a subscriber has activated call forwarding, the home location register data base 14 provides to the gateway mobile switching center 12, the phone number to which the calls for the subscriber are to be forwarded, but it also returns to the gateway mobile switching center 12, information that identifies the mobile switching center 16 or 18, or geographic division thereof, that the call 26 would have been routed to but for the subscriber's request to forward his calls to another number.

When the gateway mobile switching center 12 receives a telephone number (or wireless number) to which a call 26 is to be forwarded from the home location register data base 14, the gateway mobile switching center 12 can thereafter proceed to forward the call 26 directly to a switching system 28 in the PSTN to which the call 26 needs to be routed to deliver the call 26 to the subscriber's destination number. By determining from the home location register data base 14 that a call 26 to a mobile telephone 20 is to be routed to a particular number, and by obtaining the identity of the mobile switching center, or geographic division thereof, 16 or 18 that would have otherwise received the call 26 and which then would have forwarded the call 26, the call can be more quickly routed to its destination but an appropriate service charge can be levied on the subscriber by determining the path that the call 26 would have been forwarded over, if the call would have originated from the subscriber's wireless telephone 20.

The location of where a forwarded call would have been originated from, if it were placed by the wireless subscriber's phone 20, i.e., the mobile switching center 16 or 18 having "jurisdiction" of the mobile phone 20, can be determined a number of ways. In a preferred embodiment, the mobile switching center having jurisdiction of a mobile telephone number can be identified by the digits of a location routing number assigned to the mobile switching center 16 or 18. In particular, the first six digits of a location routing number can identify where a call should have originated from and how a call forwarded from, should be billed. Accordingly, in at least one embodiment, the home location register data base 14 stores the first six digits of a non-ported telephone number assigned to the switch to identify the jurisdiction of the switch into which the mobile telephone number of the calls of which are forwarded to another number was ported.

Other information stored in the home location register data base 14 includes the electronic serial number and the mobile identification number for a wireless subscriber's telephone. As set forth above, the home location register data base 14 stores data that identifies communication services provided to the wireless subscriber by the subscriber's service provider, including information that specifies whether the wireless subscriber is provided with call forwarding service.

In the preferred embodiment, signaling messages between the gateway mobile switching center 12, the home location data base register 14 and mobile switching centers 16 and 18 and between any network-external switch 28 to which calls are sent using well-known SS7 messages. Messages sent to the home location register data base 14 from the gateway mobile switching center that include requests for subscriber information, can be compliant with ANSI-41 or compliant with messages used in a "3GPP" signaling environment.

As is well-known, switching systems used in wireless communications networks and switching systems used in the PSTN employ a stored-program computer to control one or more matrices by which calls can be routed from a source on a switch input port to a destination on a switch output port. As used herein, the term "computer" should be considered to be equivalent to and include, one or more switching systems or switch matrices as they are sometimes called.

With respect to the home location register data base register 14, it too is comprised of a computer but also a data storage device, such as one or more hard disk drives, one or more CD-ROM drives and/or semiconductor memory from which information about the systems coupled to it can be quickly recovered and sent into the network 10 to which it is coupled and by which messages to the various computers/switches can be sent.

As is well known, computers are comprised of a central processing unit or CPU that executes program instructions. Accordingly, each of the switching systems/computers disclosed above is comprised of at least one processor that executes instructions that are stored in a program memory to which the processors are operatively coupled.

Figure 2:
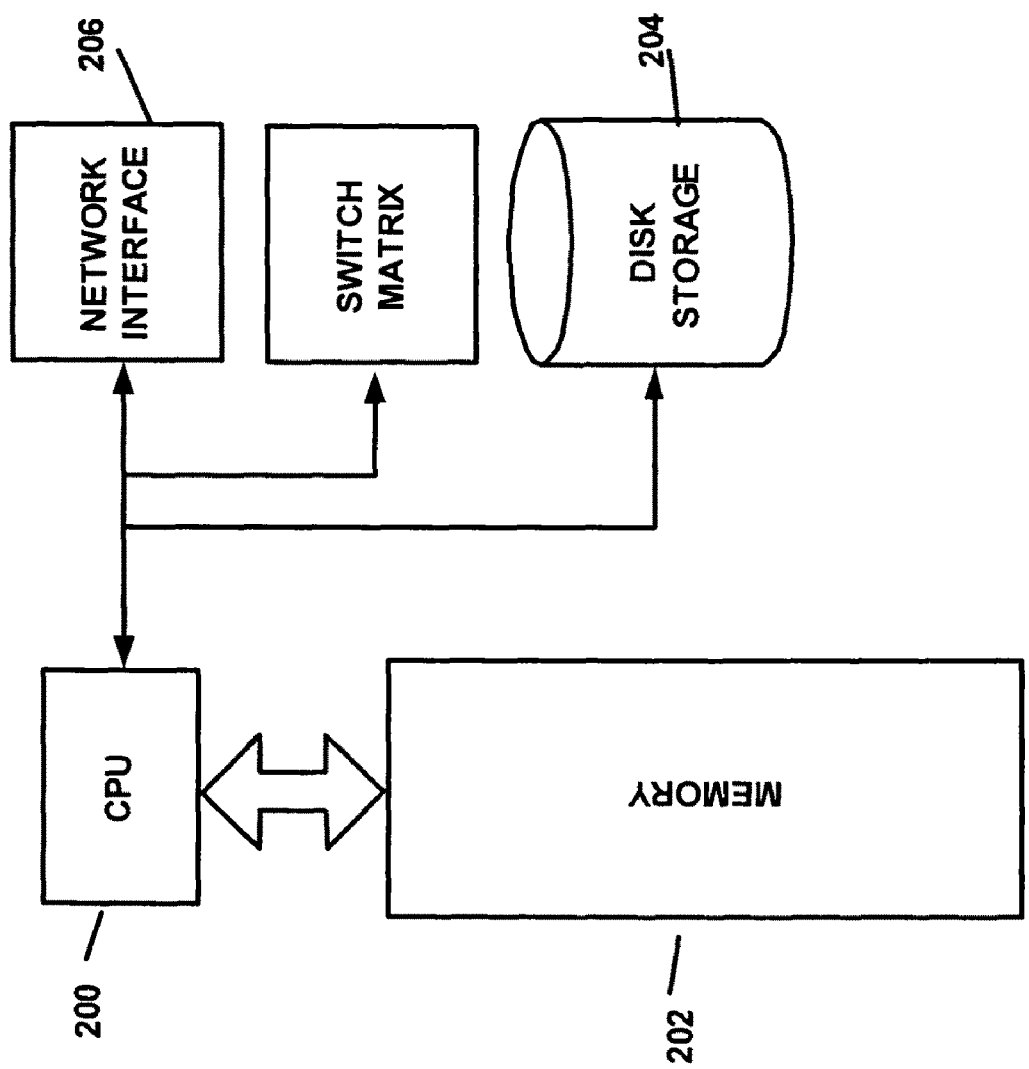
FIG. 2 is a representation of one exemplary part of the switches embodied in FIG. 1 as the mobile switching centers and the gateway mobile switching center.

FIG. 2 shows an example of a CPU 200 is coupled to memory 202 embodied in well known devices such as RAM, ROM, EEPROM and Flash memory, which can store instructions for the CPU. FIG. 2 also shows the CPU coupled to a hard disk storage 204 device and to a network interface 206 through which the CPU can communicate with the data network. Computers, memory, storage devices and network interfaces are well-known in the art and a further presentation of them herein is omitted for brevity.

Figure 3:
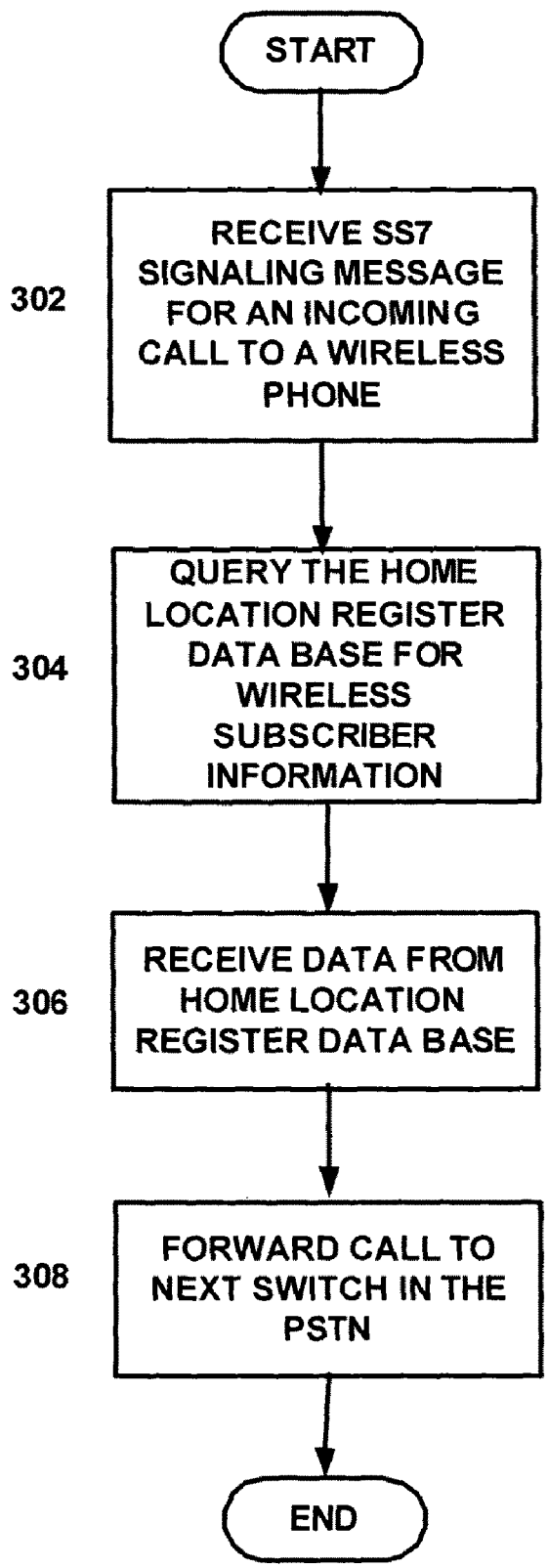
FIG. 3 is a flow chart showing steps of a method practiced by the gateway mobile switching center shown in FIG. 1.
Figure 4:
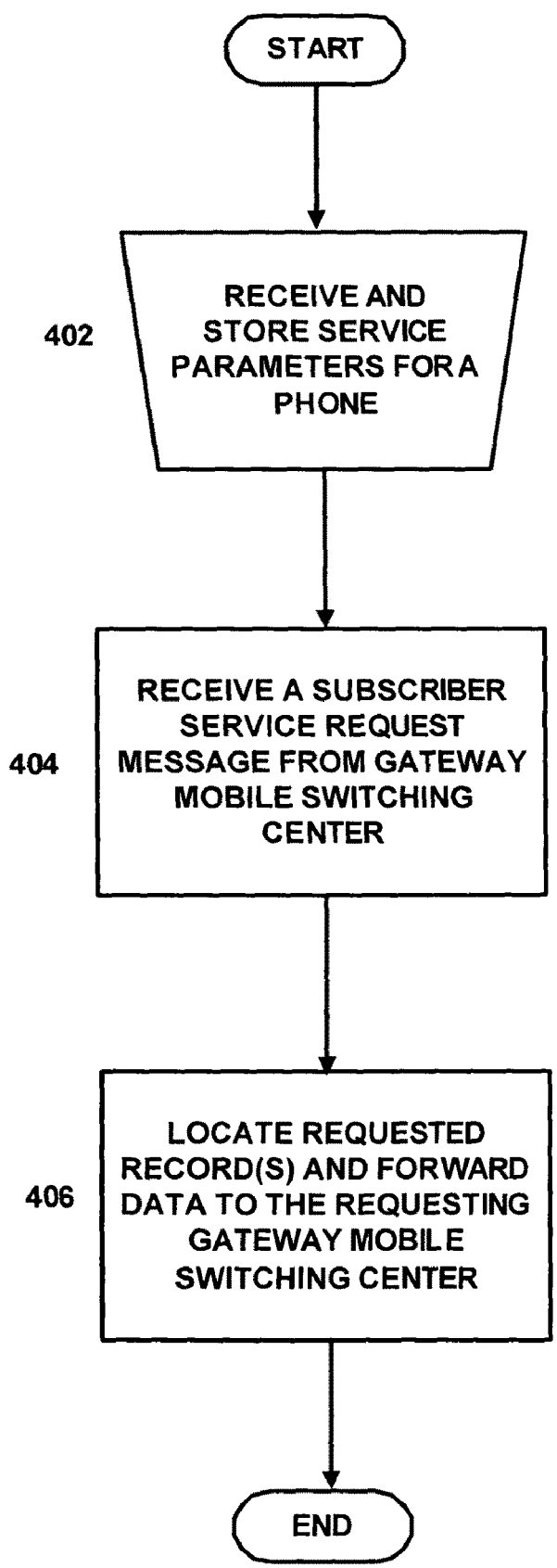
FIG. 4 is a flow chart showing steps of a method practiced by the home location register data base shown in FIG. 1.

An illustrative description of exemplary operation of the network of FIG. 1 is presented, for explanatory purposes in the flow charts of FIGS. 3 and 4. The steps of FIG. 3 are performed by the gateway mobile switching center 12 whereas the steps of FIG. 4 are performed by the home location register data base 14.

In FIG. 3, step 302 shows the receipt of a signaling message by, or at, the gateway mobile switching center 12. The signaling message can be an SS7 signaling message but regardless of its format, it can be considered to be a message by which a call is being directed to a mobile telephone 20 within the wireless communications network 10 for which the gateway mobile switching center 12 receives incoming calls.

In step 304, after having received the pertinent call data, the gateway mobile switching center 12 sends a different message to the home location register data base 14 by which the gateway mobile switching center 12 requests information on the mobile telephone to which the call just received is to be routed.

In step 306, the gateway mobile switching center 12 receives data from the home location register data base 14 that tells the gateway mobile switching center 12 several things but in particular, a number to which a call to the telephone 20 is to be forwarded instead. Importantly, the home location register data base 14 provides in its responsive message 17, the identity and/or location of the mobile switching center that the call to the mobile telephone would have been routed to by the gateway mobile switching center 12, if the subscriber had not directed his calls to be forwarded. In so doing, the home location register data base 14 identifies to the gateway mobile switching center 12, the identity and location of a geographic area or location from which the forwarded call 26 should be billed.

In step 308, the call to the wireless telephone 20 is routed by the gateway mobile switching center 12 to another switching system 28, that is the next switch to which the call 26 needs to be routed in order to route the call to the destination number. Data received by the gateway mobile switching center 12 from the home location register data base 14 that identifies the mobile switching center that would have forwarded the call if the gateway mobile switching center had not done so, is also forwarded to the next switch 28 so that upon completion of the forwarded call, the subscriber who forwarded the call from his mobile phone number can be billed for the call-forwarding service that was provided, i.e., for the distance over which the call had to be carried and the networks through which the call had to be routed.

FIG. 4 depicts steps performed by the home location register data base 14, which also is comprised of a computer, program memory and a storage device. Like the gateway mobile switching center 12 and the mobile switching centers 16 and 18, the home location register data base 14 is coupled to the network 10.

In step 402, the home location register data base 14 receives data on the subscribers within a wireless communications network and the services that are to be provided to them. As an example, the home location register data base 14 stores information on whether a particular phone number should be provided with call forwarding and if so, records information that indicates when calls are to be forwarded and a number to which the calls are to be routed. The data that is received for storage within the home location register data base 14 can originate from a variety of sources, at least one of which is the operator of the wireless communications network at the time that a telephone/number is put into service.

The home location register data base 14 also stores information on mobile phone numbers that are "ported" in to a wireless service provider network 10 by a customer of another service provider who wishes to transport his mobile phone number to the service provider for network 10. In such a case, a number that originated from a pool of numbers of a service provider and to which a mobile switching center would have been assigned, is mapped or associated to another mobile switching center, possibly located in a different geographic region.

In step 404, the home location register data base 14 register receives from the gateway mobile switching system 12, a message that is an inquiry, requesting information on a mobile telephone number/subscriber to which a call that arrived at the gateway 12, should be routed.

In step 406, the requested information is located by the home location register data base 14 processor/computer from its associated data storage devices and sent to the gateway mobile switching center 12 for processing the call according to the instructions and information received from the home location register data base 14. Once the gateway mobile switching center 12 receives the home location register data base responsive message 17, the gateway mobile switching center 12 can forward the call 26 to another switch 28, with the call forwarding information and call origination data from the home location register data base 14 so that the call can be properly routed and billed by service providers along the way.

In light of the foregoing, it should be apparent to those of ordinary skill that by using the invention disclosed and claimed herein that mobile telephone number portability can be provided and services such as automatic call forwarding properly billed by retrieving the identity and location of a switching system that would have been required to route a call to a number to which calls to a mobile phone number are to be routed. By routing such a call from a gateway mobile switching center that received it, around the mobile switching center that would normally accept calls for the wireless telephone, unnecessary call processing overhead is avoided and forwarded calls can be properly billed.

The system and methods described above are examples. There may be many variations to the examples described above without departing from the spirit of the invention. For instance, the steps may be performed in a differing order, or steps may be added, deleted, or modified. In addition, there are many types of call redirection, of which immediate call forwarding is only one. The method of redirecting the call to another telephone number is independent of this invention. Examples of other types of call redirection to which this invention applies are call forwarding no page response, call forwarding busy line, call forwarding no answer, intelligent network based call redirection, late call forwarding, redirection to voice mail, selective call forwarding, etc.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. In wireless communications network that provides wireless communications services, a method of redirecting a call placed to a wireless subscriber's number, to a second number, comprising the steps of:
    receiving at a home location register data base a query message from a gateway mobile switching center;
    returning a response message from the home location register data base to the gateway mobile switching center, the response message having at least information as to how and where to route a call that is to be forwarded;
    sending from the home location register data base to the gateway mobile switching center a phone number to which the call is to be forwarded, and information that identifies a mobile switching center or a geographic division thereof that the call would have been routed to but for the forwarding of the call; and
    routing the call directly to a switch associated with the phone number instead of to the mobile switching center; and
    billing for forwarded calls by retrieving identity and location of a switching system that would have been required to route the call to a number to which calls to a mobile phone number are to be routed and, by routing the call from the gateway mobile switching center that received the call, around the mobile switching center that would normally accept calls for the mobile phone number;
    wherein the gateway mobile switching center forwards the call to another switch, with call forwarding information and call origination data from the home location register data base so that the call is properly routed and billed by respectively associated service providers;
    wherein, by determining from the home location register data base that a call to a mobile telephone is to be routed to a particular number, and by obtaining an identity of the mobile switching center that would have otherwise received the call and which then would have forwarded the call, the call is routed to its destination and an appropriate service charge is levied on the subscriber by determining a path that the call would have been forwarded over, if the call would have originated from a subscriber's mobile telephone.

2. The method of claim 1, wherein the mobile switching center having jurisdiction of a mobile telephone number is identifiable by digits of a location routing number assigned to the mobile switching center.

3. The wireless communication network of claim 2, wherein a first six digits of a location routing number identify where a call should have originated from and how a call forwarded therefrom is be billed.

4. The method of claim 3 wherein the home location register data base stores the first six digits of a non-ported telephone number assigned to the switch to identify a jurisdiction of the switch, into which was ported a mobile telephone number of calls which are forwarded to another number.

5. In a wireless communication network, a method of routing a wireless telephone call to a wireless subscriber, comprising the steps of:
    storing, in a first computer that is coupled to the communications network, information that identifies at least some services provided to the wireless subscriber by a wireless service provider;
    receiving, by the first computer, a first message, the first message including a request for information about the wireless subscriber;
    sending, by the first computer, a second message that is a response to the first message that identifies:
    a number to which a call to the wireless subscriber is to be redirected; and
    subscriber jurisdiction information for the wireless subscriber; and
    billing for forwarded calls by retrieving identity and location of a switching system that would have been required to route the call to the number to which calls to a mobile phone number are to be routed and, by routing the call from a gateway mobile switching center that received the call, around a mobile switching center that would normally accept calls for the mobile phone number;
    wherein calls redirected from a mobile phone number to another number are billed based on the service provider and a distance over which a forwarded call portion would have traveled if it had been placed by a non-roaming mobile telephone.

6. The method of claim 5 wherein the step of receiving, by the first computer, the first message, includes the step of receiving said first message from a second computer that is also coupled to the wireless network.

7. The method of claim 5, wherein the step of storing includes the step of:
    storing in the first computer, the identity of a mobile switching center, or geographic division thereof, that has jurisdiction over a geographic coverage area for the wireless subscriber number.

8. The method of claim 5, wherein the step of storing information includes the step of storing: the identity of the mobile switching center or geographic division thereof, for the home service area of a mobile, in a storage device that is operatively coupled to the first computer, from which a call is to be redirected.

9. The method of claim 5, wherein the step of storing information includes steps for storing at least one of:
   an electronic serial number for a wireless subscriber's telephone;
   a mobile identification number for a wireless subscriber's telephone;
   services provided to the wireless subscriber by the subscriber's service provider;
   information that specifies whether the wireless subscriber is provided with call redirecting service;
   the identity of a mobile switching center, or geographic division thereof, to which calls to the wireless subscriber's number, are to be routed by switching systems that are coupled to the switching network.

10. The method of claim 5, wherein the step of receiving a first message includes the step of receiving a message that is in the SS7 signaling format.

11. A method of redirecting a call that is placed to a wireless telephone number, to another number, comprising the steps of:
   sending a first message by a first computer to a second computer, the first message requesting from the second computer, information about the wireless telephone number;
   receiving, by the first computer, a response to the first message that identifies at least, a telephone number to which calls that are placed to the wireless telephone number are to be redirected by a third computer; and
   said first computer routing, the call placed to the wireless telephone number, to a fourth computer; and
   billing for forwarded calls by retrieving identity and location of a switching system that would have been required to route the call to a number to which calls to a mobile phone number are to be routed and, by routing the call from a gate way mobile switching center that received the call, around a mobile switching center that would normally accept calls for the mobile phone number;
   wherein calls redirected from a mobile phone number to another number are billed based on the first computer and a distance over which a forwarded call portion would have traveled if it had been placed by a non-roaming mobile telephone.

12. The method of claim 11, wherein the step of receiving by the first computer, a response to the first message includes receiving information that also includes at least one of:
   an identifier for the third computer;
   the identity of the mobile switching center or geographic division thereof, that has jurisdiction for the mobile;
   an electronic serial number of the wireless telephone number; and
   communications services provided to the wireless telephone number.

13. The method of claim 11, further comprising the step of:
   redirecting the call and jurisdiction information received in the response from the second computer to the fourth computer.

14. The method of claim 11, wherein the step of receiving by the first computer, a response to the first message includes the step of receiving information about the wireless telephone number from a home location register database.

* * * * *